United States Patent
Xiong et al.

(10) Patent No.: US 11,010,696 B2
(45) Date of Patent: May 18, 2021

(54) JOB ALLOCATION

(71) Applicant: ACCENTURE GLOBAL SOLUTIONS LIMITED, Dublin (IE)

(72) Inventors: Guanglei Xiong, Fremont, CA (US); Chung-Sheng Li, Scarsdale, NY (US); Christopher Cole, San Anselmo, CA (US); Michael Dekshenieks, Menlo Park, CA (US); Kayhan Moharreri, San Jose, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 162 days.

(21) Appl. No.: 15/917,510

(22) Filed: Mar. 9, 2018

(65) Prior Publication Data

US 2018/0260746 A1    Sep. 13, 2018

Related U.S. Application Data

(60) Provisional application No. 62/470,052, filed on Mar. 10, 2017.

(51) Int. Cl.
*G06Q 10/06* (2012.01)
*G06N 20/00* (2019.01)
(Continued)

(52) U.S. Cl.
CPC ......... *G06Q 10/0631* (2013.01); *G06F 15/76* (2013.01); *G06F 40/279* (2020.01);
(Continued)

(58) Field of Classification Search
CPC .... G06Q 10/0631; G06N 20/00; G06F 15/76; G06F 17/2765; G06F 17/278; G06F 17/28
See application file for complete search history.

(56) References Cited

U.S. PATENT DOCUMENTS 8,918,789 B2 * 12/2014 Gatti ...................... G06N 20/00
                                                        718/103
2008/0066072 A1    3/2008 Yurekli et al.
(Continued)

OTHER PUBLICATIONS

Jung, Yong Gyu, Min Soo Kang, and Jun Heo. "Clustering performance comparison using K-means and expectation maximization algorithms", Biotechnology & Biotechnological Equipment, S44-S48 (Year: 2014). NPL retrieved from google scholar https://doi.org/10.1080/13102818.2014.949045.*

(Continued)

*Primary Examiner* — Patricia H Munson
*Assistant Examiner* — Marjorie Pujols-Cruz
(74) *Attorney, Agent, or Firm* — Mannava & Kang, P.C.

(57) ABSTRACT

Examples of job allocation are described hereon. In an example, a job for allocation may be received. The job may be analyzed to obtain information pertaining to the job. The information may comprise at least one of a domain of the job and a priority level of the job. Further, performance of resources may be determined to provide resource information. The resource information may be determined using a supervised learning model comprising a job vector for each job type and a resource vector corresponding to each resource. The resource information may include a list of resources with at least one of a corresponding probability of each resource completing the job and a performance score of each resource. Based on the job information and the resource information, the resource may be recommended for the job using an expertise-estimation modeling technique and the job may be assigned to the recommended resource, accordingly.

10 Claims, 5 Drawing Sheets

(51) Int. Cl.
 G06F 15/76 (2006.01)
 G06F 40/40 (2020.01)
 G06F 40/279 (2020.01)
 G06F 40/284 (2020.01)
 G06F 40/295 (2020.01)
(52) U.S. Cl.
 CPC .......... *G06F 40/284* (2020.01); *G06F 40/295* (2020.01); *G06F 40/40* (2020.01); *G06N 20/00* (2019.01); *G06Q 10/0633* (2013.01); *G06Q 10/0639* (2013.01)

(56) References Cited

U.S. PATENT DOCUMENTS

| | | | |
|---|---|---|---|
| 2008/0209431 A1 | 8/2008 | La Vecchia et al. | |
| 2013/0096968 A1* | 4/2013 | Van Pelt | G06Q 10/06398 705/7.13 |
| 2015/0317582 A1* | 11/2015 | Nath | G06Q 10/06311 705/7.13 |
| 2016/0063192 A1* | 3/2016 | Johnson | G06Q 10/0635 705/2 |
| 2017/0076241 A1* | 3/2017 | Kunde | G06Q 50/01 |
| 2018/0158016 A1* | 6/2018 | Pandya | G05B 19/41895 |

OTHER PUBLICATIONS

Raschka, Sebastian. "Predictive modeling, supervised machine learning, and pattern classification", (Year: 2014). NPL retrieved from https://sebastianraschka.com/Articles/2014_intro_supervised_learning.html.*

Jung, Yong Gyu, Min Soo Kang, and Jun Heo. "Clustering performance comparison using K-means and expectation maximization algorithms", Biotechnology & Biotechnological Equipment, S44-S48. NPL retrieved from google scholar https://doi.org/10.1080/13102818.2014.949045 (Year: 2014).*

Raschka, Sebastian. "Predictive modeling, supervised machine learning, and pattern classification",. NPL retrieved from https://sebastianraschka.com/Articles/2014_intro_supervised_learning.html (Year: 2014).*

* cited by examiner

JOB ALLOCATION

PRIORITY

This application claims priority to U.S. provisional patent application Ser. No. 62/470,052, filed on Mar. 10, 2017, which is incorporated by reference in its entirety.

BACKGROUND

Generally, each organization has a wide variety of tasks, which may be performed by resources, automated or otherwise. For example, manual resources may be employed to perform certain tasks, and once sufficient knowledge pertaining to these tasks is accumulated, these tasks may later be performed by automated resources.

Consider a task such as, for example, a content moderation task. The content moderation task may include examining whether content such as, for example, advertisement submissions, are compliant with predefined policies before the content is posted on a public forum such as, for example, Facebook™ or Twitter™. An organization may employ the manual resources to moderate such content before posting the ad publicly. In addition, the organization may also use Artificial Intelligence (AI) tools for performing tedious and repetitive tasks instead of having such tasks performed by the manual resources.

While certain tasks may be relatively simple and straightforward, certain tasks may be complex and may require skilled resources. Typically, complexity of the tasks follows an eighty-twenty rule, where eighty percent of a task volume is considered as easy and may be tackled by twenty percent of total effort, i.e., available resources, while twenty percent of the task volume is difficult and may take eight percent of the total effort. However, the definition of complexity is relative. That is, easy tasks for manual resources may be difficult for computational resources, and vice versa. Likewise, easy tasks for one manual resource may be difficult for another, and vice versa. Thus, how efficiently a task may be performed may depend on a resource performing the task.

Typically, tasks are assigned either randomly, empirically by supervisors, or by using a simplistic assignment technique such as round robin, or on a first come first serve basis. However, such techniques generally do not factor in aspects, such as, for example, a type of task, and an experience, a skill-set, ability, and availability of a resource. As a result, inappropriate allocation of task may affect the efficiency with which the task may be performed. For example, time and resources used in performing the task and a quality of output may be affected. It will be appreciated that a low quality of output, may in turn affect computations performed by the AI tools, which rely on knowledge accumulated by performing these tasks. Moreover, in instances an input queue includes a large volume of tasks, manually assigning each task may not only be cumbersome but may also be prone to errors and inefficient.

This presents a technical problem of devising task scheduling mechanism that may efficiently identify a resource to perform the task to reduce cost (computational and otherwise), minimize computational and other errors, and better utilize manual and computational resources.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
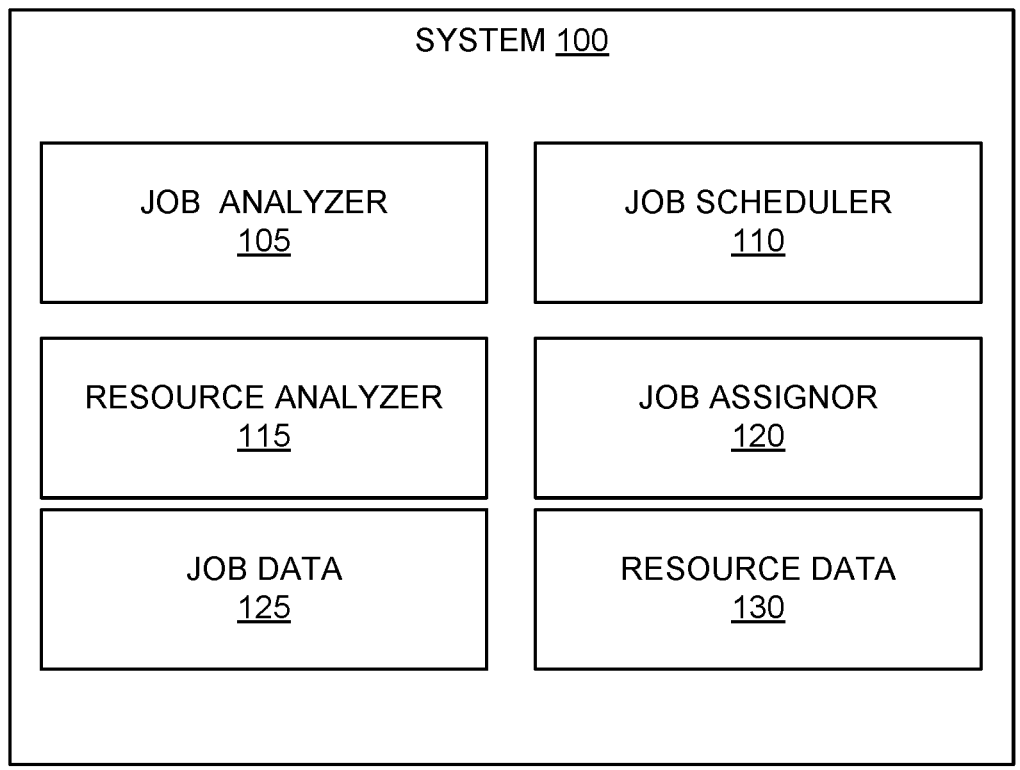
FIG. 1 illustrates a system for adaptive job scheduling, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on. Further, terms "job" and "task" are used interchangeably in both their singular and plural form.

The present disclosure describes systems and methods for scheduling jobs in an organization. The job may pertain to a variety of domains, and may involve an organization's internal administrative tasks or may involve project related tasks. In an example embodiment, a job scheduler may identify appropriate resources to perform a job to be allocated. The job scheduler may identify appropriate resources, based on information pertaining to the job, referred to as job information, and information pertaining resources of the organization, referred to as resource information. For example, a job analyzer may analyze an incoming job to identify attributes, such as a domain, a priority level, and a complexity level. Further, a resource analyzer may provide information pertaining to various resource attributes, such as, for example, a skill set, an experience, and a performance.

For example, if the job involves content moderation requiring identification of violation of broadcasting policies, the job scheduler may recommend a resource that has the appropriate skills, experience, and training to moderate such violations. Likewise, if the job at hand involves content moderation requiring domain knowledge, for example, knowledge pertaining to device, such as a laptop, a mobile device, etc., then the job scheduler may determine another resource, who may be appropriate perform such a task.

In one example, the job scheduler may implement techniques, such as an expertise-estimation modeling technique to recommend appropriate resources for a job to be allocated. Based on an expertise-estimation model, the job scheduler may recommend one or more appropriate resources to handle the job by matching the job type to resources with the appropriate background, for example, skills, experience, training, ability, availability, etc. In an example embodiment, the expertise-estimation model may employ an Expectation-Maximization (EM) technique, which iteratively determines model parameters and resources' expertise until it converges.

In an example, where multiple resources may be recommended, the job scheduler may also associate a weight factor with each of the resources recommended for the job, based on information pertaining to availability of the recommended resources and performance of the resource. The job may be assigned to one of the recommended resources, based on the weighing factors. For example, the resource with highest weight factor may be selected and assigned the job. Such a provision ensures that skilled resources are not overworked and jobs are evenly distributed.

Thus, the present disclosure provides a mechanism of allocating jobs in an efficient manner, in terms of time and resources. The intelligent processing of the information pertaining to jobs to be allocated and resources, may provide identification of appropriate resource. Further, resources may be better utilized, which otherwise would have been wasted owing to inefficient allocation. For example, since the system provides a recommendation, based on a skill set, a job type, and availability information, the probability of identifying an inappropriate resource are minimized. Consequently, the repeated allocation cycles may now be avoided, thereby resulting in efficient utilization of resources. Also, as the recommended resources may have an expertise in handing such job, computational resources may be better utilized. Furthermore, techniques implemented to identify appropriate resources such as, for example, the expertise-estimation model, may reduce the CPU (Central Processing Unit) cycles and memory required as opposed to conventional systems.

FIG. 1 illustrates a system 100 for allocating jobs to resources in an organization, according to an example embodiment of the present disclosure. In an example embodiment, the system 100 uses a combination of Artificial Intelligence (AI) and machine learning techniques to perform a variety of operations associated with job allocation. Although the present disclosure has been explained in considerable details with respect to a job pertaining to ad content moderation, the principles described herein may be used to assign resources for other kinds of jobs as well such as, for example, troubleshooting network issues, providing assistance with health insurance.

In an example, the system 100, amongst other things, includes a job analyzer 105, a job scheduler 110, a resource analyzer 115, a job assignor 120, job data 125, and resource data 130. The job data 125 may include details pertaining to jobs, such as jobs pending for allocation, allocated jobs, and completed jobs. The resource data 130 may include details pertaining to resources of the organization. For example, the resource data 130 may include details such as, an experience of a resource, a skill set of the resource, availability of the resource, and information pertaining to performance of the resource. The job data 125 and the resource data 130 may be internal to the system 100 or may be provided as separate data stores external to the system 100.

In operation, a new job, which is to be allocated to a resource may be received by the job analyzer 105. The job analyzer 105 analyses the content of the job, using various content analysis techniques such as, for example, topic modeling, sentiment analysis, tokenization, named entity recognition, syntactic parsing, and related job retrieval. Based on the analysis, the job may be classified into one or more of pre-defined categories or domains. The categories may be defined in terms of content, task type, and complexity level. Further, the analysis may include determining a priority level, a complexity level, average effort hours required for completing the job, etc. In an example, each incoming job may have a predefined priority level associated with it, where the priority level specifies a service level objective, for example, a deadline for completion of the job. The job analyzer 105, upon analysis, may provide job information including, for example, a domain of the job, a complexity level, and a priority level, to aid in identification suitable resources.

In an example, on receiving the job information, the job scheduler 110 may also obtain information pertaining to the resources. In an example, the job scheduler 110 may request the resource analyzer 115 to provide information pertaining to the resources in a domain identified by the job analyzer 105. The resource analyzer 115, for example, may employ a supervised learning model such as, an expertise-estimation model and a soft-margin classifier, which may approximate the likelihood of each resource completing an incoming job. For this purpose, the resource data 130 may be utilized as the training data to build the supervised learning model. The model may include supervision labels representing successful or unsuccessful completion of a historical job by each resource. Once the model is trained, when a job is received by the system 100, the resource analyzer 115 may provide a list of resources, which may complete the job according to the learning model. This list is accompanied by the likelihood for each resource to complete the incoming job.

In an example, the resource analyzer 115 may implement a bivariate supervised learning model for determining the probability of a resource completing a job, where model variables are a job vector and a resource vector, which are taken in as input features. The job vector may represent the key features of the job. For example, consider a job relating to content moderation. In this example, the job vector may be a linguistic word vector, which may include bigram frequency values for all word pairs.

Likewise, the resource vector is a dynamic representation of a resource's expertise with respect to the jobs handled by the resource in the past. The resource vector has the same dimensionality as the job vector. In an example, the resource vector for each resource may be determined by building an average word frequency vector of all the job vectors that the resource was able to complete in the past.

In another example, the resource vector of each resource may be considered as a vector of parameters, which may be learned along with the model parameters of the expertise-estimation model during the model training. The parameter estimation may be performed iteratively by, for example, stochastic gradient descent, which converges to parameter values that maximize the likelihood of the training data. This strategy guarantees that the generated resource vectors include high intensity values for words that appear frequently in the jobs that they can complete with success and include low intensity values for the words that appear frequently in the jobs that they cannot complete with success. A byproduct of generating the resource vectors is that they may also be utilized to refer resources to organizational training with the goal of aligning their expertise with content areas that have high job volumes.

Based on the analysis, the resource analyzer 115 may provide the resource information indicative of the probability of the resource performing the new job.

On receiving the resource information from the resource analyzer 110 and the job information from the job analyzer 105, the job scheduler 110 may recommend one or more resources to perform the job. The job scheduler 110 may use the expertise-estimation model to process the job information pertaining to the job and the resource data pertaining to the resources. By performing such expertise-estimation modeling, the job scheduler 110 may be able to identify appropriate resources for a new job by understanding the nature of the job and the capacity of resources. The expertise-estimation model may aid in optimizing the performance of the resources for an incoming job queue over a certain period of time. In an example embodiment, the job scheduler 110 to perform the expertise estimation may employ Expectation-Maximization (EM) technique.

In another example embodiment, where multiple resources are identified, to ensure jobs are evenly distributed, the job scheduler 110 may also factor in other aspects, such as availability of a resource and a current job queue of a resource, while recommending the resource. For example, a resource with higher workload may be assigned a lower weightage as compared to a resource with a comparatively lighter workload. The process of assigning weights and load balancing is explained in detail with reference to description of FIG. 2.

Based on the recommendations and weights associated with the recommendations, the job assignor 120 may allocate the job to a resource. For example, the resource with higher weightage may be selected. Accordingly, the resource may be allocated the job and the resource data 130 may be updated.

Figure 2:
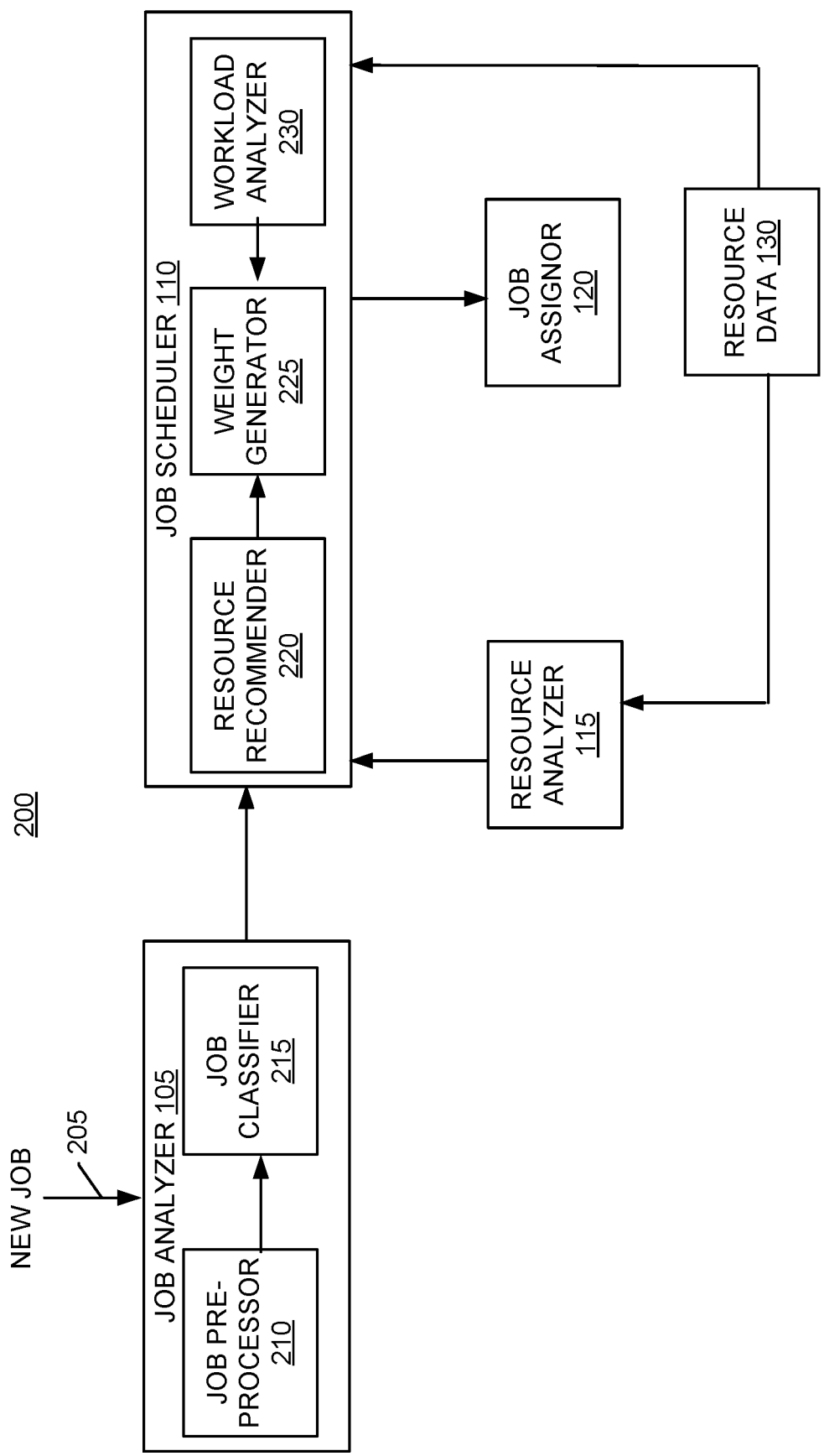
FIG. 2 illustrates a schematic flow to schedule a job, according to an example embodiment of the present disclosure.

FIG. 2 illustrates a schematic flow 200 for allocating a job to a resource, according to an example embodiment of the present subject matter. As mentioned earlier, a new job, indicated by arrow 205, may be received by the job analyzer 105. The job analyzer 105 may include, for example, a job preprocessor 210 and a job classifier 215. The job preprocessor 210 may process the information pertaining to job for identification of job attributes, such as, for example, a priority level, average effort hours required for completion, and a complexity level. The job preprocessor 210 may also analyze content of the job to aid the job classifier 215 in classifying the job to an appropriate domain/category. It will be appreciated that the content of the ad may not just be indicative of the ad type, such as language policy violation or language policy violation, but the ads may be classified on other basis as well such as linguistic complexity.

For example, if the new job involves moderating language policy violations, the job preprocessor 210 may be then process the job details to determine that type of ads, for example, cosmetics, electronics, or clothing. The job classifier 215 may then use supervised machine learning techniques to classify the job into predefined categories. In other examples, the job classifier 215 may also use unsupervised machine learning to cluster the jobs into different categories to naturally spanned categories.

The job classifier 215 may provide the job information pertaining to the new job to the job scheduler 110 to aid in identification an appropriate resource for the new job. In an example, the job scheduler 110 may receive the resource data, such as, details pertaining to performance, from the resource analyzer 115 continuously. The performance information may include details pertaining to performance metrics, such as, for example, accuracy, sensitivity, specificity, or recall achieved by the resource, and average time taken to complete a given job. The performance information pertaining to resources may be stored in the resource data 130.

The continuous monitoring of performance may allow the job scheduler 110 to dynamically adapt its resource recommendations over a period of time. In other words, the job scheduler 110 may dynamically change resources recommended for a job, as resource performance evolves over the course of time.

For example, a resource who previously was not proficient in moderating content for language policy violation may, over a period of time, may be able handle such jobs. While the resource may not have been previously recommended by the job scheduler 110 to moderate for language policy violation, as the resource's performance improves, the resource may at some point in time be recommended by the job scheduler 110 to perform job involving language policy violation. In an example, a resource may be considered for a job, when the performance score for such job is greater than a predefined threshold. Accordingly, when a resource's performance score improves and is beyond the predefined threshold, the resource may be recommended for the job.

In an example, the resource analyzer 115 may continuously monitor the performance of resources, and periodically re-train the expertise-estimation model. To capture the performance in the expertise-estimation model, the resource analyzer 115 may monitor performance metrics to decide on degrees of successful or unsuccessful completion of the job. The performance metrics are such as, for example, average time taken to complete a given job, accuracy, sensitivity, and specificity achieved in completing the job. For example, in a content moderation job where the task is to remove inappropriate content from the text, the accuracy may be measured by the count of words, whose appropriateness is identified correctly by the resource divided by total count of words in the job. Also, sensitivity may be measured by the count of inappropriate words marked correctly by the resource divided by the total count of inappropriate words. Similarly, specificity may be defined. The performance metrics may be stored in the resource data 130.

In an example embodiment, a push protocol may be used to provide performance metrics from the resource data 130 to the resource analyzer 115 for analysis. In another example embodiment, a pull protocol may be used to obtain the performance metrics from the resource data 130 by the resource analyzer 115.

Based on a combination of performance metrics for a resource, the resource analyzer 115 may compute and associate a performance score with the resource for performing a job in a given domain. For example, if a resource is moderating content for language policy violation and moderating content for spam policy violation as well, the resource analyzer 115 may score the performance of the resource separately for each content type. Such a provision accounts for a possibility that the same resource may perform differently in different domains or categories.

Combination of the metrics may be done by normalization and interval transformation for each metric using, for example, min-max normalization or sigmoid transformation, and computing the average across all metrics. The performance score represents the degree of successfulness on a given job and may be considered as a fuzzy label for training expertise-estimation model.

Continuing with the same example, the resource analyzer 115 may determine that a resource performs better in moderating content of language policy violation as compared to moderating content of spam policy violation. The performance of a resource may be different in different domains owing to a variety of reasons, such as, for example, the resource may have had more experience and/or better training in moderating the content of language policy violation as compared to spam policy violation or it may just be that the resource has an aptitude for working on language policy violation. In any event, allowing for such granularity in monitoring resource performance may help the job scheduler 110 to make an appropriate resource recommendation for a new job.

Further, as mentioned earlier, the resource analyzer 115 may also determine a probability of a resource of completing the job, using a bivariate model. Thus, a performance score and a probability of completing the task may be provided as part of the resource information to the job scheduler 110 for recommending appropriate resources.

In an example, the job scheduler 110 may include a resource recommender 220, a weight generator 225, and a work load analyzer 230. The resource recommender 220 may implement the expertise-estimation technique to determine the appropriate resources. The resource recommender 220 may filter the information received from the resource analyzer 115 to select a group of resources pertaining to the domain corresponding to the job to be allocated. For example, the resource recommender 220 may determine a scheduling score with resources, based on the probability and the performance score associated with each resource.

Based on the scheduling score and recommendation criteria, one or more resources may be recommended. The recommendation criteria may define logic for selecting one or more resources for the new job. For example, the recommendation criteria may indicate all resources with a scheduling score greater than a predefined threshold may be selected. In another example, the recommendation criteria may indicate that the resources with top three scheduling scores may be selected.

In one example, a recommended resource may already have a heavy work load. Therefore, it may be infeasible to assign the new job to the recommended resource even if the resource may be best suited for the job. To account for this situation, the job scheduler 110 implements the weight generator 225. The weight generator 225 may receive may receive details pertaining to recommend resources from the resource recommender 220 and details pertaining to current workload from the workload analyzer 225

The workload analyzer 225 may monitor work load of the resources. In an example, details pertaining to workload may be stored in the resource data 130. The workload information in the resource data 130 may be provided by real-time tracking of the current number and complexity of jobs assigned to each individual resource. It will be appreciated other mechanisms for tracking workload may also be used.

In addition to workload monitoring, the workload analyzer 225 may also factor in a priority level associated with the new job. The workload analyzer 225 for each new job with a predefined priority, determines a current higher priority load of all resources. Based on the current higher priority load, the workload analyzer 225 may provide an availability score to all resources based on their availability. The resource with least heavy workload may get the highest score, thereby indicating that the next job may be assigned to that resource.

The weight generator 225 may use the availability scores for resources obtained from the workload analyzer 225 and the scheduling scores from the resource recommender 220. In an example, for a range of availability scores and/or scheduling scores, corresponding weight factors may be defined. In an example embodiment, the weight generator 225 may use a simple linear combination of both scores to assign weight factors. In another example embodiment, the weight generator 225 may consider a resource's performance history (from scheduling score), and current availability (from availability score), and determine the overall weight factor in a nonlinear fashion.

For example, if the availability score for a resource indicates that the resource is extremely busy, then the weight generator 225 may assign a low overall weight factor to reflect the low availability score. On the other hand, if the recommended resource is relatively busy, then the weight generator 225 may still assign a high overall weight factor to the recommended resource because it determines that that resource particularly excels in the job to be processed.

In one example embodiment, the weight generator 225 may provide information pertaining to the new job and the recommended resources with the corresponding weight factors to the job assignor 120. The job assignor 120 may assign a resource to the new job based on the weight factors associated with the recommended resources.

For example, if the new job pertains to content moderation for language policy violation, the resource recommender 220 may recommend the top two resources for the job based on the resource information received from the resource analyzer 115 and the job information received from the job analyzer 105. The weight generator 225 may then assign appropriate weight factors to each of the recommendations based on input provided by the workload balancer 225. For example, if the first recommended resource is busier than the second recommended resource, then the first resource may be assigned a lower weight factor than the second resource. The job assignor 120 may then assign the job to the second resource because of a higher weight factor being associated with the second resource.

Such a provision ensures that the better performing resources are not overworked, thereby reducing the chance of worker dissatisfaction and attrition. While ensuring resource satisfaction, the present disclosure that the alternative resources are also suitable for the job. Further, the efficient assignment of jobs may aid better in utilization computational resources as multiple processing cycles may not be wasted in allocating and then again reallocating the jobs due to allocation to an inappropriate resource.

Figure 3:
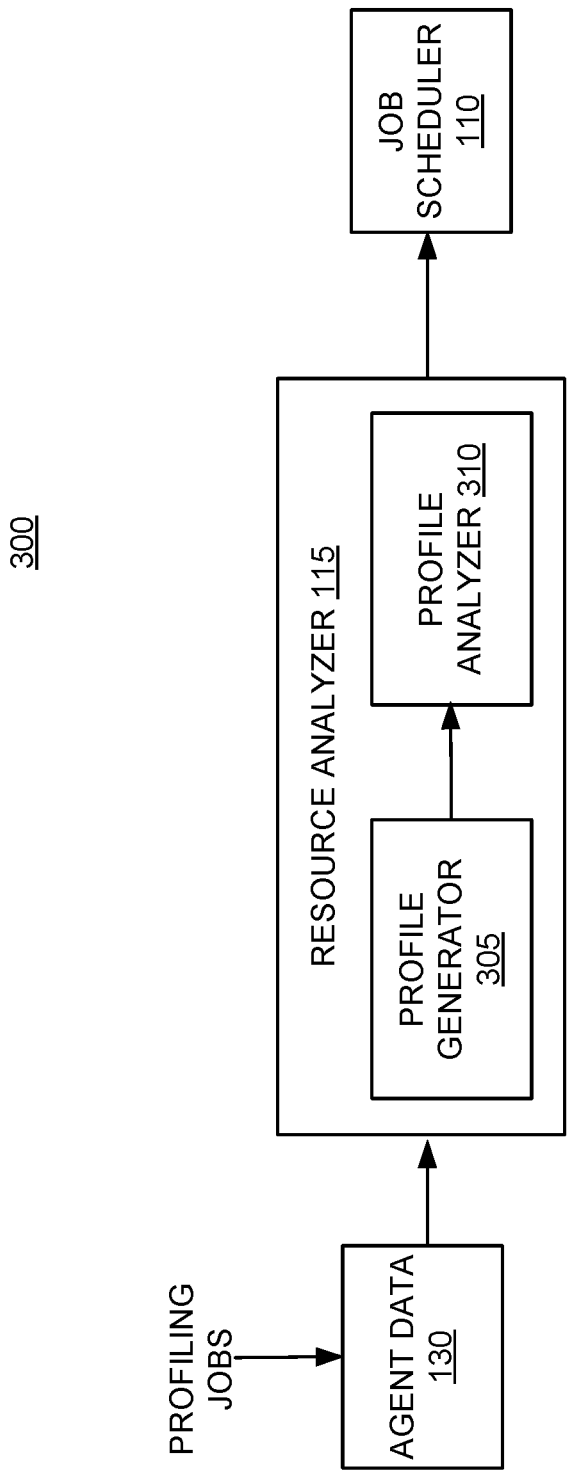
FIG. 3 illustrated a schematic flow to assess a resource, according to an example embodiment of the present disclosure.

FIG. 3 illustrates a schematic flow 300 for resource profiling, according to an example embodiment of the present subject matter. The resource profiling may be performed by the system 100 to score a resource's performance to determining a skill level of the resource to work on certain jobs. In an example embodiment, the resource analyzer 115 may include a resource profiler 305 and a profile analyzer 310.

In operation, known jobs with predetermined performance metrics, also referred to as profiling jobs, may be provided for profiling. For example, ads, whose content has already been moderated, may be provided as profiling tasks to a resource. In an example, the resources may not be aware that they are being tested when working on these tasks. The performance of the resources, for example, the resources registered in the resource data 130 for the profiling jobs may be measured against the predetermined performance metrics. Based on the performance of a resource on each profiling job representing a domain, the resource profiler 305 may score the resource for each of the profiling jobs. Thus, the resource profiler 305 may generate a performance score for the resource, for each domain.

The details pertaining to performance may be provided to the profile analyzer 310, which may incorporate the performance information, while determining the performance and probability of a resource performing a particular job type. The profile analyzer 310 may implement a bivariate supervised learning model for determining the probability of a resource performing the job, where a job vector and a resource vector may be taken as features to provide a probability of a resource performing a job.

Based on the information provided by the profile analyzer 310 and the profile generator 305, the job scheduler 110 may select resources to be recommended for a new job. For example, the job scheduler 110 may analyze the performance score with respect to a predefined threshold. For example, if a resource's performance score meets or exceeds a predefined threshold, the resource may be considered appropriate for performing that type of job and may be recommended for future jobs of that type. If not, then the resource may not be recommended for that job type.

As described earlier, the performance data may be used by the job scheduler 110 to determine resources to be recommended for a new job.

Figure 4:
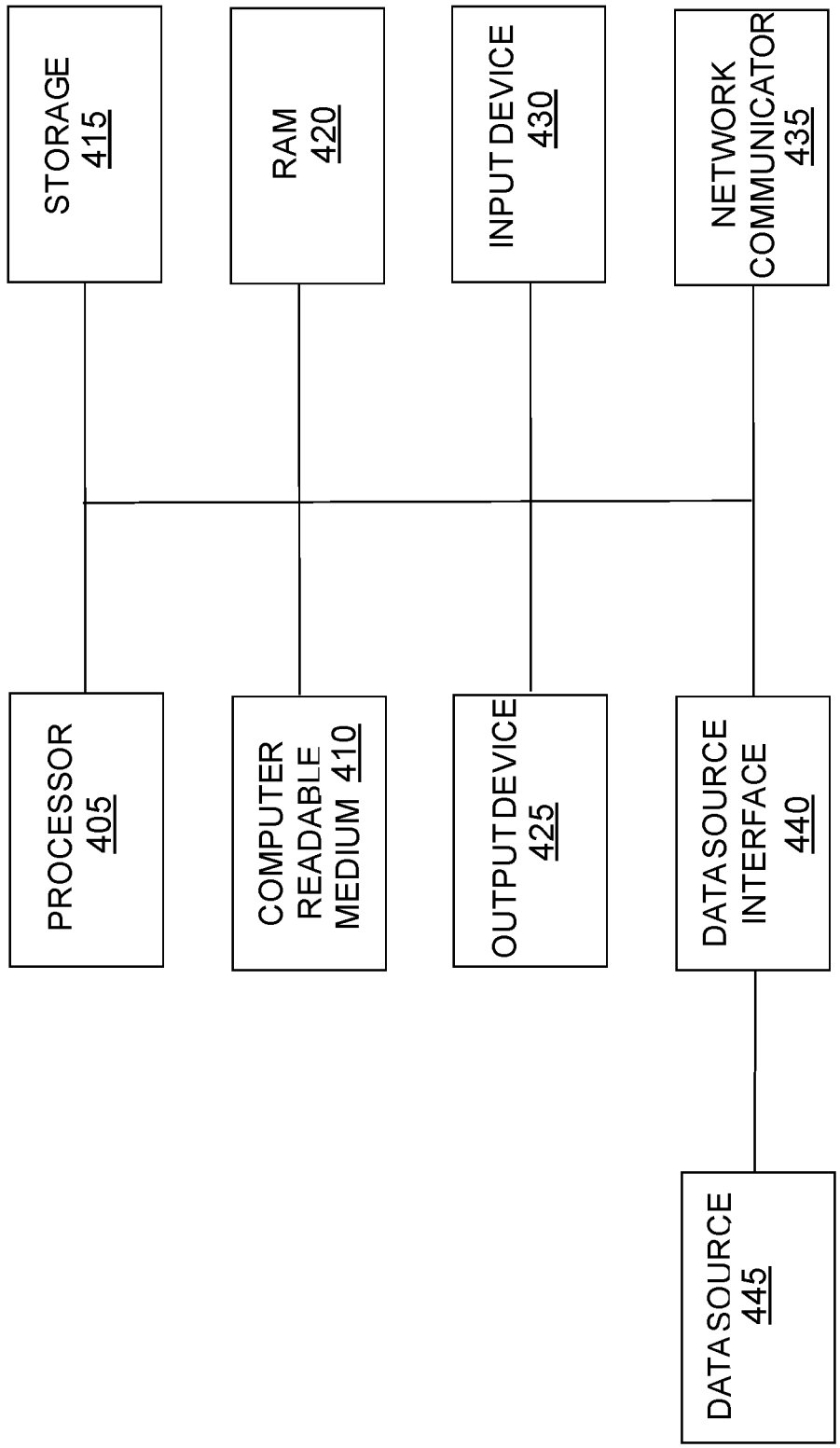
FIG. 4 illustrates a hardware platform for implementation of the system, according to an example embodiment of the present disclosure.

FIG. 4 illustrates a hardware platform 400 for implementation of the system 100, according to an example of the present disclosure. In an example embodiment, the hardware platform 400 may be a computer system 400 that may be used with the examples described herein. The computer system 400 may represent a computational platform that includes components that may be in a server or another computer system. The computer system 400 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory). The computer system 400 may include a processor 405 that executes software instructions or code stored on a non-transitory computer readable storage medium 410 to perform methods of the present disclosure. The software code includes, for example, instructions to obtain job data and resource data and analyze job data and the resource data to recommend resources for a new job. In an embodiment, the job analyzer 105, the job scheduler 110, the resource analyzer 115, and the job assignor 120 are a software code or a component performing the above steps.

The instructions on the computer readable storage medium 410 are read and stored the instructions in storage 415 or in random access memory (RAM) 420. The storage 415 provides a large space for keeping static data where at least some instructions could be stored for later execution. The stored instructions may be further compiled to generate other representations of the instructions and dynamically stored in the RAM 420. The processor 405 reads instructions from the RAM 420 and performs actions as instructed.

The computer system 400 further includes an output device 425 to provide at least some of the results of the execution as output including, but not limited to, visual information to users, such as external agents. The output device can include a display on computing devices. For example, the display can be a mobile phone screen or a laptop screen. GUIs and/or text are presented as an output on the display screen. The computer system 400 further includes input device 430 to provide a user or another device with mechanisms for entering data and/or otherwise interact with the computer system 400. The input device may include, for example, a keyboard, a keypad, a mouse, or a touchscreen. In an embodiment, output of the intelligent risk management agent is displayed on the output device 425. Each of these output devices 425 and input devices 430 could be joined by one or more additional peripherals.

A network communicator 435 may be provided to connect the computer system 400 to a network and in turn to other devices connected to the network including other clients, servers, data stores, and interfaces, for instance. A network communicator 435 may include, for example, a network adapter such as a LAN adapter or a wireless adapter. The computer system 400 includes a data source interface 440 to access data source 445. A data source is an information resource. As an example, a database of exceptions and rules may be a data source. Furthermore, knowledge repositories and curated data may be other examples of data sources.

Figure 5:
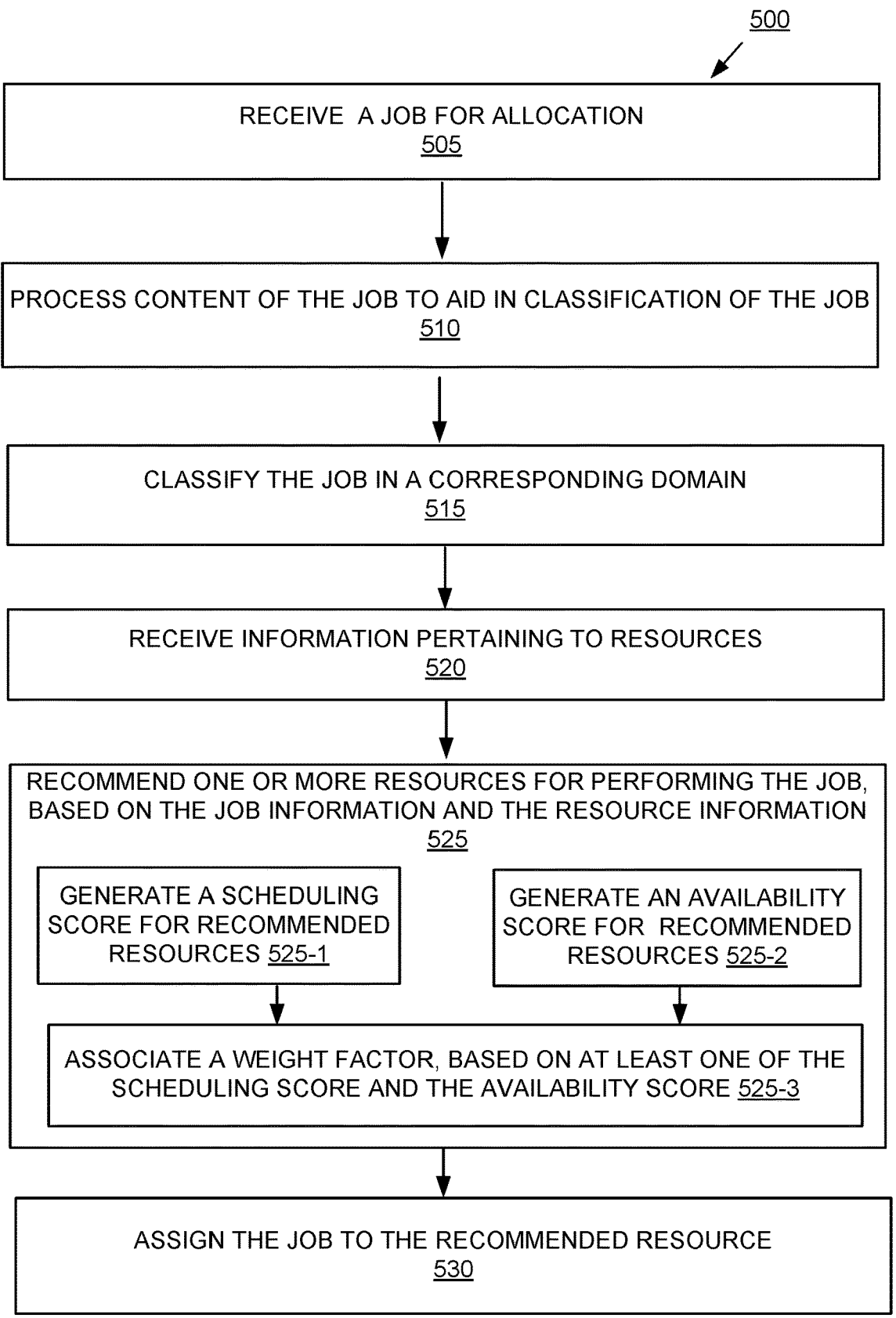
FIG. 5 illustrates a computer-implemented method depicting functionality of the system, according to an example embodiment of the present disclosure.

FIG. 5 illustrates a computer-implemented method 500 depicting functionality of the system 100, according to an example embodiment of the present disclosure. For the sake of brevity, construction and operational features of the system 105 which are explained in detail in the description of FIG. 1, FIG. 2, FIG. 3, and FIG. 4 are not explained in detail in the description of FIG. 5.

At method block 505, the method 500 commences with receiving a job for allocation. The job may relate to internal tasks or external tasks performed by resources in an organization. The job analyzer 110 may receive the job.

At block 510, content of the job may be processed to aid in classification of the job. In an example, the job analyzer 110 may implement based on at least one at least one of a topic modeling technique, a sentiment analysis technique, a tokenization technique, a named entity recognition technique, a natural language processing technique, and a related job retrieval technique.

At block 515, the job may be classified into a corresponding domain, based on the analyzed content. In an example, the job analyzer 110 may use at least one of a supervised learning technique and an unsupervised learning technique to classify the job into a corresponding domain. The domain may be defined in terms of content type, complexity level, and/or a priority level.

At block 520, information pertaining to the resources may be received. The information may include details pertaining to performance of the resources and a probability of the resources performing the job. In an example, the resource analyzer 115 may provide the resource information. In one example, the resource analyzer 115 may also continuously monitor the performance of the resources, based on profiling jobs to determine performance of the resources to determine resource information. The resource information may be determined using a supervised learning model, such as, for example, a bivariate supervised learning model, comprising a job vector for each job type and a resource vector corresponding to each resource. The resource information may include a list of resources with at least one of a corresponding probability of each resource completing the job and a performance score of each resource.

At block 525, based on the job information and the resource information, one or more resources may be recommended for performing the job. In an example, the job scheduler 110 may implement an expertise-estimation modeling technique to recommend the resources.

In an example, when multiple resources are to be recommended, from the list of resources, at block 525-1, a scheduling score may be generated of the recommended resource, based on the job information and the resource information. At block 525-2, an availability score for each of the recommended resources may be generated, based on a current queue of workload of a corresponding resource. At block 525-3, a weight factor may be associated with the each of the recommended resources, based on at least one of the corresponding scheduling score and the corresponding availability score. For example, a resource is skilled in the job type but may not be available, a low weight factor may be associated with such a resource so that the resource may not be selected. Likewise, if a resource is skilled and has busy queue but the already assigned jibs are not high priority ones, a high weight factor may be associated with such a resource.

At block 530, the job may be assigned to the recommended resource, for example, based on the weight factor associated with the recommended resource. In an example, the job assignor 120 may assign the job to the recommended resource. For example, the job assignor 120 may select the resource with highest weight factor.

What has been described and illustrated herein are examples of the present disclosure. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A system, comprising:
    a processor;
    a resource database;
    a job analyzer coupled to the processor to:
        receive a job for allocation; and
        analyze the job to obtain information pertaining to the job using a content analysis technique, the information comprising at least one of a domain of the job and a priority level of the job;
    a resource analyzer coupled to the processor to:
        monitor a plurality of performance metrics of each resource of a plurality of resources, wherein the plurality of performance metrics are stored in the resource database, and wherein the plurality of performance metrics are provided from the resource database to the resource analyzer by use of a push protocol;
        normalize and interval transform a combination of the plurality of performance metrics using a min-max normalization and sigmoid function;
        determine a performance score for each resource of the plurality of resources to perform the job based on the normalized and interval transformed combination of the plurality of performance metrics, wherein the performance score represents that the corresponding resource is suitable for the job when the performance score is greater than a predetermined threshold;
        determine a list of resources with at least one of a corresponding probability of each resource completing the job and the performance score of each resource, wherein the list of the resources is determined by use of a supervised learning model, the supervised learning model comprising a job vector for each job type and a resource vector corresponding to each resource, and wherein the probability of each resource completing the job is calculated based on historical job data associated with each resource, wherein the job vector is a linguistic word vector including bigram frequency values of word pairs; a job scheduler coupled to the processor to:
    implement an expertise-estimation modeling technique employing an expectation-maximization technique to iteratively determine model parameters and expertise of the plurality of resources;
    update the list of resources over a period of time based on the iteratively determined model parameters and the expertise of the plurality of resources; and
    recommend a resource, from among the updated list of resources, to perform the job by processing the job information and the resource information using the expertise-estimation modeling technique, wherein the job scheduler comprises:
        a job recommender to generate a scheduling score for each of the plurality of resource, based on the probability of each resource completing the job and the performance score associated with each resource;
    a workload analyzer to:
    determine a workload of each of the plurality of resources based on a real-time tracking of a current number of jobs and a complexity of jobs assigned to each resource;
    a workload balancer to generate an availability score for each resource of the plurality of resources, based on the determined workload of each of the resources and a priority level of the job; and
    a weight generator to associate a weight factor with the each of the plurality of resource, based on a linear combination of the corresponding scheduling score and the corresponding availability score; and
    a job assignor coupled to the processor to assign the job to the resource based on the weight factor associated with each of the plurality of resources.

2. The system as claimed in claim 1, wherein the job analyzer comprises a job preprocessor to analyze content of the job, based on at least one of a topic modeling technique, a sentiment analysis technique, a tokenization technique, a named entity recognition technique, a natural language processing technique, and a related job retrieval technique.

3. The system as claimed in claim 2, wherein the job analyzer comprises a job classifier to classify the job into a corresponding domain, based on the analyzed content, using one of a supervised learning technique and an unsupervised learning technique.

4. The system as claimed in claim 1, wherein the resource analyzer comprises a profile generator to capture the performance in the expertise-estimation model.

5. The system as claimed in claim 1, wherein the resource analyzer comprises a profile analyzer implementing a bivariate supervised learning model to determine a probability of the resource performing the job.

6. A method, comprising:
    receiving a job for allocation;
    analyzing the job to obtain information pertaining to the job using a content analysis technique, the information comprising at least one of a domain of the job and a priority level of the job;
    monitoring a plurality of performance metrics of each resource of a plurality of resources, wherein the plurality of performance metrics are stored in a resource database, and wherein the plurality of performance metrics are provided from the resource database to the resource analyzer by use of a push protocol;
    normalizing and interval transforming a combination of the plurality of performance metrics using a min-max normalization and a sigmoid function;
    determining a performance score for each resource of the plurality of resources to perform the job based on the normalized and interval transformed combination of the plurality of performance metrics, wherein the performance score represents that the corresponding resource is suitable for the job when the performance score is greater than a predetermined threshold;

determining a list of resources with at least one of a corresponding probability of each resource completing the job and the performance score of each resource, wherein the list of the resources is determined by use of a supervised learning model, the supervised learning model comprising a job vector for each job type and a resource vector corresponding to each resource, and wherein the probability of each resource completing the job is calculated based on historical job data associated with each resource;

implementing an expertise-estimation modeling technique employing an expectation-maximization technique to iteratively determine model parameters and expertise of the plurality of resources, wherein the job vector is a linguistic word vector including bigram frequency values of word pairs;

updating the list of resources over a period of time based on the iteratively determined model parameters and the expertise of the plurality of resources;

recommending a resource, from among the updated list of resources, to perform the job by processing the job information and the resource information using the expertise-estimation modeling technique;

generating a scheduling score for each of the plurality of resource, based on the probability of each resource completing the job and the performance score associated with each resource;

determining a workload of each of the plurality of resources based on a real-time tracking of a current number of jobs and a complexity of jobs assigned to each resource;

generating an availability score for each resource of the plurality of resources, based on the determined workload of each of the resources and a priority level of the job;

associating a weight factor with the each of the plurality of resources, based on a linear combination of the corresponding scheduling score and the corresponding availability score; and assigning the job to the recommended resource based on the weight factor associated with each of the plurality of resources.

7. The method as claimed in claim 6, wherein the analyzing the job comprises:
analyzing content of the job using the content analysis technique; and
classifying the job into a corresponding domain, based on the analyzed content, using one of a supervised learning technique and an unsupervised learning technique.

8. The method as claimed in claim 6, wherein the monitoring comprises determining a probability of the resource performing the job, based on a bivariate supervised learning model.

9. A non-transitory computer readable medium including machine readable instructions that are executable by a processor to:
receive a job for allocation;
analyze the job to obtain information pertaining to the job, the information comprising at least one of a domain of the job and a priority level of the job;
monitor a plurality of performance metrics of each resource of a plurality of resources, wherein the plurality of performance metrics are stored in a resource database, and wherein the plurality of performance metrics are provided from the resource database to the resource analyzer by use of a push protocol;

normalize and interval transform a combination of the plurality of performance metrics using a min-max normalization and a sigmoid function;

determine a performance score for each resource of the plurality of resources to perform the job based on the normalized and interval transformed combination of the plurality of performance metrics, wherein the performance score represents that the corresponding resource is suitable for the job when the performance score is greater than a predetermined threshold;

determine a list of resources with at least one of a corresponding probability of each resource completing the job and the performance score of each resource, wherein the list of the resources is determined by use of a supervised learning model, the supervised learning model comprising a job vector for each job type and a resource vector corresponding to each resource, and wherein the probability of each resource completing the job is calculated based on historical job data associated with each resource, wherein the job vector is a linguistic word vector including bigram frequency values of word pairs;

implement an expertise-estimation modeling technique employing an expectation-maximization technique to iteratively determine model parameters and expertise of the plurality of resources;

update the list of resources over a period of time based on the iteratively determined model parameters and the expertise of the plurality of resources;

recommend a resource, from among the updated list of resources, to perform the job by processing the job information and the resource information using the expertise-estimation modeling technique;

generate a scheduling score for each of the plurality of resource, based on the probability of each resource completing the job and the performance score associated with each resource;

determine a workload of each of the plurality of resources based on a real-time tracking of a current number of jobs and a complexity of jobs assigned to each resource;

generate an availability score for each resource of the plurality of resources, based on the determined workload of each of the resources and a priority level of the job;

associate a weight factor with the each of the plurality of resource, based on a linear combination of the corresponding scheduling score and the corresponding availability score; and assign the job to the recommended resource based on the weight factor associated with each of the plurality of resources.

10. The non-transitory computer readable medium as claimed in claim 9, wherein to analyze the job, the processor is to:
analyze content of the job using the content analysis technique; and
classify the job into a corresponding domain, based on the analyzed content, using one of a supervised learning technique and an unsupervised learning technique.

* * * * *